(12) United States Patent
Park et al.

(10) Patent No.: US 7,275,775 B2
(45) Date of Patent: Oct. 2, 2007

(54) CRASH ACCELERATION PULSE CONTROL BLOCK FOR VEHICLE

(75) Inventors: Kwan Hum Park, Gunpo-si (KR); Nak Seung Chung, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 11/292,756

(22) Filed: Dec. 1, 2005

(65) Prior Publication Data

US 2006/0113779 A1  Jun. 1, 2006

(30) Foreign Application Priority Data

Dec. 1, 2004  (KR)  ............... 10-2004-0099640

(51) Int. Cl.
*B60R 19/02* (2006.01)

(52) U.S. Cl. .................................. 293/102

(58) Field of Classification Search ........... 293/102, 293/120, 121, 132, 133; 296/187.03, 187.09, 296/187.1

See application file for complete search history.

(56) References Cited

U.S. PATENT DOCUMENTS

| | | | | |
|---|---|---|---|---|
| 5,425,561 A | * | 6/1995 | Morgan | 293/120 |
| 5,560,662 A | * | 10/1996 | Apgar et al. | 293/121 |
| 6,547,295 B2 | * | 4/2003 | Vismara | 293/133 |
| 6,609,740 B2 | * | 8/2003 | Evans | 293/121 |
| 6,644,701 B2 | * | 11/2003 | Weissenborn et al. | 293/120 |
| 6,685,243 B1 | * | 2/2004 | Evans | 293/102 |
| 6,726,262 B2 | * | 4/2004 | Marijnissen et al. | 293/121 |
| 6,746,061 B1 | * | 6/2004 | Evans | 293/120 |
| 6,866,313 B2 | * | 3/2005 | Mooijman et al. | 293/120 |
| 7,086,690 B2 | * | 8/2006 | Shuler et al. | 296/187.03 |
| 2005/0089674 A1 | * | 4/2005 | Zander et al. | 428/158 |
| 2006/0001278 A1 | * | 1/2006 | Evans et al. | 293/133 |
| 2006/0043743 A1 | * | 3/2006 | Shuler et al. | 293/120 |
| 2006/0055187 A1 | * | 3/2006 | Jaarda et al. | 293/133 |
| 2006/0082169 A1 | * | 4/2006 | Kuhne | 293/102 |
| 2006/0125250 A1 | * | 6/2006 | Evans | 293/121 |

* cited by examiner

*Primary Examiner*—H Gutman
(74) *Attorney, Agent, or Firm*—Morgan Lewis & Bockius LLP

(57) ABSTRACT

A crash acceleration pulse control block for a vehicle. An auxiliary mounting unit capable of adjusting a crash contact area while serving as a bumper is installed at a front portion of a radiator lower member to obtain reliable initial crash acceleration of the vehicle. This is an important factor for determining the deployment of the airbag, even if the engine specification and the vehicle weight are changed, thereby accurately deploying an airbag according to the sensing operation of an airbag sensor when a vehicle accident occurs.

4 Claims, 3 Drawing Sheets

CRASH ACCELERATION PULSE CONTROL BLOCK FOR VEHICLE

CROSS-REFERENCE TO RELATED APPLICATION

This application claims priority to and the benefit of Korean Patent Application 10-2004-0099640 filed in the Korean Intellectual Property Office on Dec. 1, 2004, the entire content of which is incorporated herein by reference.

BACKGROUND OF THE INVENTION

1. Field of the Invention

The present invention relates to a crash acceleration pulse control block for a vehicle. More particularly, the present invention relates to a crash acceleration pulse control block confirmed to provide reliable initial crash acceleration data even in situations where the engine specification or the vehicle weight have been changed to thereby more accurately deploy an airbag.

2. Description of the Related Art

In general, an airbag unit operates when a vehicle accident occurs in order to deploy an airbag according to the crash detected by the airbag unit. In other words, when it is expected that a vehicle occupant may be injured due to predicted crash parameters, the airbag unit deploys the airbag so as to reduce impact applied to the occupant through the impact absorbing performance of the airbag.

For example, when a vehicle collides with a wall, as shown in FIG. 6, an ACU (airbag control unit) detects the crash pulse. Acceleration of the vehicle detected by the ACU is converted into velocity and vibration energy as shown in FIGS. 7 and 8 through a digital data process, such as filtering.

If the velocity and vibration energy increase beyond a critical line, the ACU deploys the airbag. However, if the vehicle crash occurs with low acceleration, as represented in FIG. 6 with a dotted line, relatively low velocity and vibration energy data are detained. These low valves are potentially below the critical line as shown in FIGS. 7 and 8 (dashed line), so the ACU may not deploy the airbag.

The level of the vehicle crash is determined according to the level of acceleration detected by means of an accelerometer of the ACU installed in the vehicle. In addition, the airbag is deployed depending on the level of acceleration detected by means of an accelerometer.

Generally, if the vehicle collides with a rigid wall, crash impact is applied over the relatively large area of the vehicle so that the vehicle is directly influenced by the vehicle crash. In this case, the level of acceleration caused by the vehicle crash is prominently represented so that the ACU can easily determine the deployment of the airbag. However, when a frontal crash, an offset crash, a side impact crash or a rear-end crash, for example, occurs between vehicles, the level of acceleration may be determined depending on rigidity and the contact area between vehicles, so relatively low initial acceleration may be represented in general. This means that the vehicles have low rigidity and the contact area between the vehicles is small, so that the vehicles subject to such a crash represent the level of acceleration significantly lower than that of the vehicles colliding with the rigid wall under the same crash velocity condition. If the level of initial acceleration of the vehicle is small, the ACU may not deploy the airbag, causing damage to the occupants.

Another problem of the prior art is derived from mass production of the vehicles. That is, since various kinds of engines and optional components are installed in the vehicles having the same chassis, vehicles may be equipped with engines and optional components having the different weight. For this reason, acceleration variation may occur in a range of about 10% even if the crash test is performed using vehicles having the same vehicle class under the same crash velocity. Thus, it is difficult for the ACU to determine the deployment of the airbag.

Alternatively, in order to allow vehicles having different specifications and using the same chassis to represent similar initial crash acceleration under the same crash condition, there has been suggested a method of providing the vehicles with bumpers having different sizes or shapes, respectively. However, this method has no practical use because the cost of the bumper is very expensive.

SUMMARY OF THE INVENTION

Embodiments of, the present invention provide a crash acceleration pulse control block for a vehicle with an auxiliary mounting unit, such as an auxiliary back beam or a block structure having a honeycomb shaped section. The auxiliary mounting unit is capable of adjusting the crash contact area while serving as a bumper. The unit may be installed at a front portion of a radiator lower member to obtain reliable initial crash acceleration of the vehicle, which is an important factor for determining the deployment of the airbag, even if the engine specification and the vehicle weight are changed. In this manner the air bag is more accurately deployed according to the sensing operation of the airbag sensor when a vehicle accident occurs.

An exemplary embodiment of, the present invention includes a crash acceleration pulse control block of a vehicle comprising: an auxiliary mounting unit installed at a front portion of the vehicle to absorb impact energy applied to the vehicle when a vehicle accident occurs, wherein the auxiliary mounting unit adjusts a crash contact area of the vehicle in order to allow an airbag to be accurately deployed based on reliable initial crash acceleration of the vehicle even if an engine specification and a vehicle weight are changed.

According to a further exemplary embodiment of the present invention, the auxiliary mounting unit includes a combination type block structure having a honeycomb shaped section, in which a number of blocks provided in the combination type block structure is adjustable according to a vehicle specification so as to adjust a level of initial crash acceleration of the vehicle when the vehicle accident occurs.

According to another exemplary embodiment of the present invention, the auxiliary mounting unit includes an auxiliary bumper back beam in the form of a bar having a predetermined length, in which a sectional area of the bar is adjustable or a material for the bar is changeable according to a vehicle specification so as to adjust a level of initial crash acceleration of the vehicle when the vehicle accident occurs.

BRIEF DESCRIPTION OF THE DRAWINGS

The above and other features and advantages of the claimed invention will be more apparent from the following detailed description taken in conjunction with the accompanying drawings.

DETAILED DESCRIPTION OF THE PREFERRED EMBODIMENTS

Figure 1:
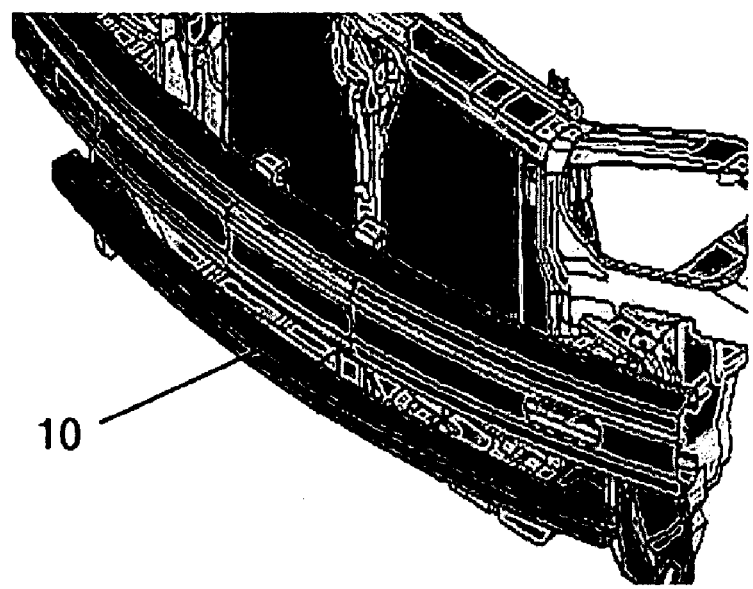
FIGS. 1 and 2 are partial perspective views of a vehicle illustrating a crash acceleration pulse control block according to one embodiment of the present invention.

Hereinafter, preferred embodiments of the present invention will be described with reference to the accompanying drawings. In the following description and drawings, the same reference numerals are used to designate the same or similar components, so repetition of the description on the same or similar components will be omitted.

According to an embodiment of the present invention, an auxiliary mounting unit is installed at a lower portion of a bumper provided at a front portion of a vehicle to obtain reliable initial crash acceleration of the vehicle even if the engine specification and the vehicle weight are changed, thereby accurately deploying an airbag based on the reliable initial crash acceleration of the vehicle, which is an important factor for determining the deployment of the airbag. To this end, embodiments of the present invention increase the level of initial acceleration according to crash velocity in order to accurately determine the deployment of an airbag. To increase the level of initial acceleration according to crash velocity, the chassis of the vehicle is made from a rigid member or the crash contact area of the vehicle is enlarged.

However, if the chassis of the vehicle is made from the rigid member, the vehicle weight increases. In addition, the vehicle having the chassis made from the rigid member may harm other vehicles and present inferior crash energy absorption performance when a vehicle accident occurs, thereby injuring occupants in the vehicle. Therefore, according to an exemplary embodiment of the present invention, the crash contact area of the vehicle is enlarged while improving crash energy absorption performance of the vehicle when the vehicle accident occurs. Embodiments of the present invention are realized by utilizing characteristics of a front portion of the vehicle including a bumper.

Alternatively, in order to allow vehicles having different specifications and using the same chassis to represent similar initial crash acceleration under the same crash condition, there has been suggested a method of providing the vehicles with bumpers having different sizes or shapes, respectively. However, this method has no practical use because the cost of the bumper is very expensive.

Figure 2:
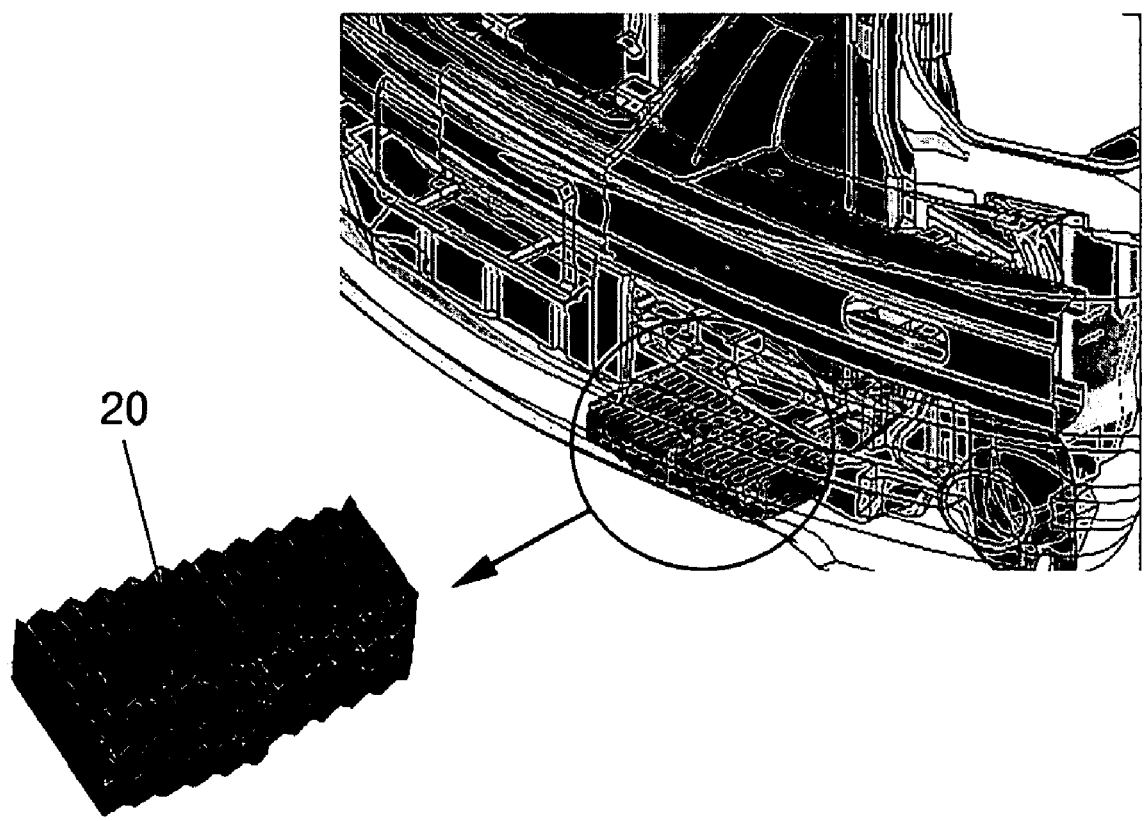

According to embodiments of the present invention, various auxiliary mounting units are installed at front portions of vehicles having different specifications and using the same chassis, thereby allowing the vehicles to represent similar initial crash acceleration under the same crash condition. To this end, according to exemplary embodiment of the present invention, as shown in FIG. 2, a combination type block structure 20 having a honeycomb shaped section with a predetermined length is provided as an auxiliary mounting unit. The number of blocks provided in the block structure 20 can be adjusted according to the vehicle specifications or vehicle classes so as to adjust the level of initial acceleration when the vehicle accident occurs. The block structure 20 may be made from plastic, aluminum or steel and may be installed between a front portion of a radiator lower member and a lower end of a bumper cover of the vehicle.

According to another exemplary embodiment of the present invention, as shown in FIG. 1, the auxiliary mounting unit is provided as an auxiliary back beam 10 in the form of a bar having a predetermined length and made from, for example, aluminum, steel or magnesium. The sectional area of the bar having the predetermined length can be adjusted or the material for the bar can be changed according to the specifications of the vehicles such that initial crash acceleration of the vehicles can be adjusted.

Similar to the block structure 20, the auxiliary back beam 10 is installed at the front portion of the radiator lower member of the vehicle. In particular, the auxiliary back beam 10 is installed in a space section formed at a lower end of a bumper back beam.

Figure 3:
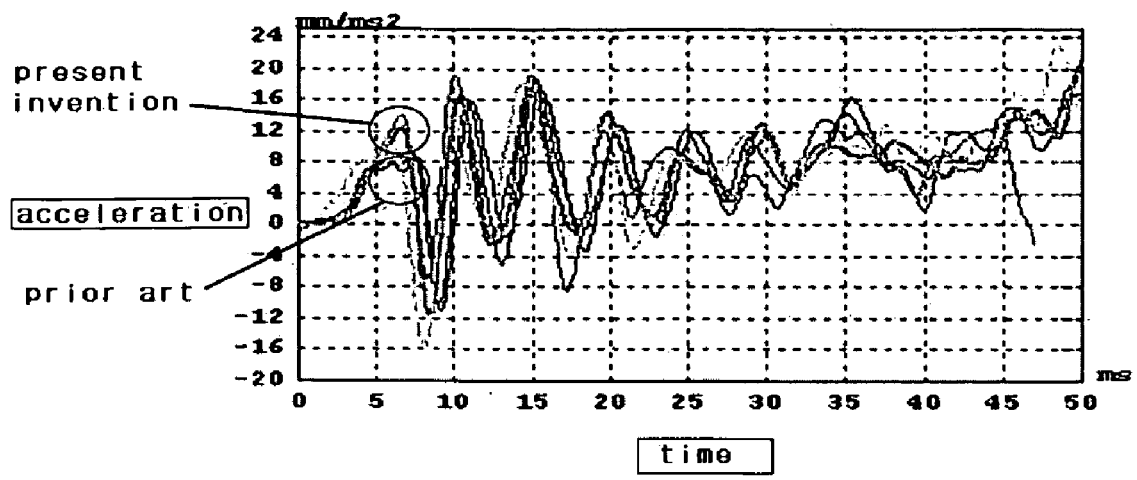
FIG. 3 is a graph illustrating variation in initial acceleration between the prior art and the present invention having a crash acceleration pulse control block.

FIG. 3 is a graph illustrating variation of initial crash acceleration between the prior art and the present invention having the crash acceleration pulse control block. As can be understood from FIG. 3, the initial crash acceleration of the present invention is higher than that of the prior art.

Figure 4:
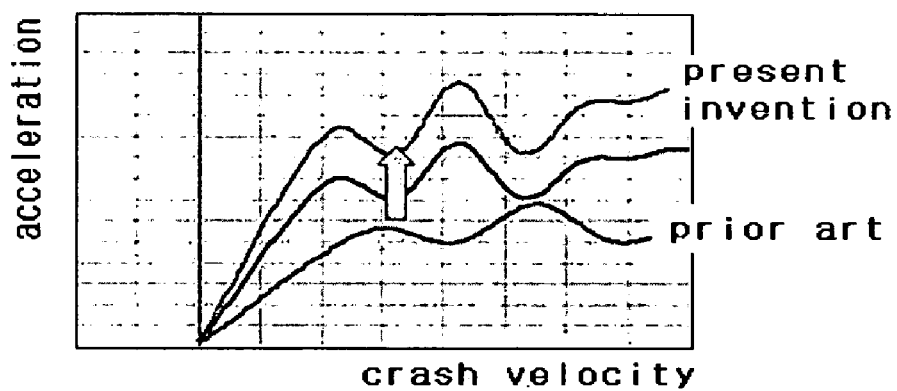
FIG. 4 is a graph illustrating initial acceleration as a function of crash velocity between the prior art and the present invention.
Figure 5:
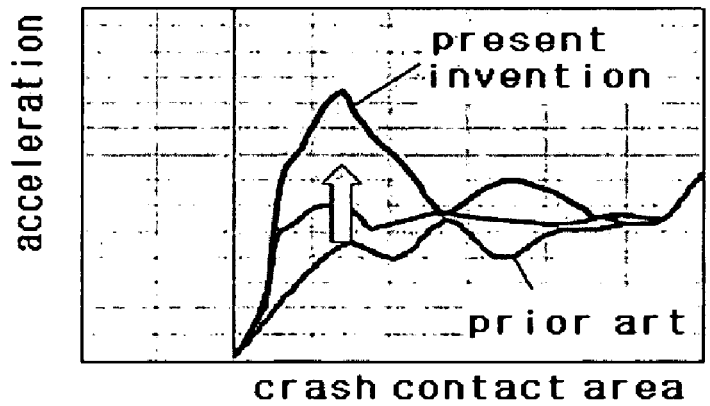
FIG. 5 is a graph illustrating initial acceleration as a function of crash contact area between the prior art and the present invention.
Figure 6:
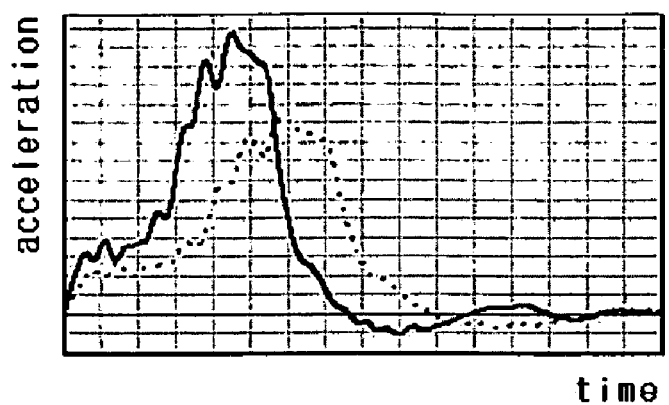
FIG. 6 is a graph illustrating acceleration as a function of time when a vehicle crash occurs.
Figure 7:
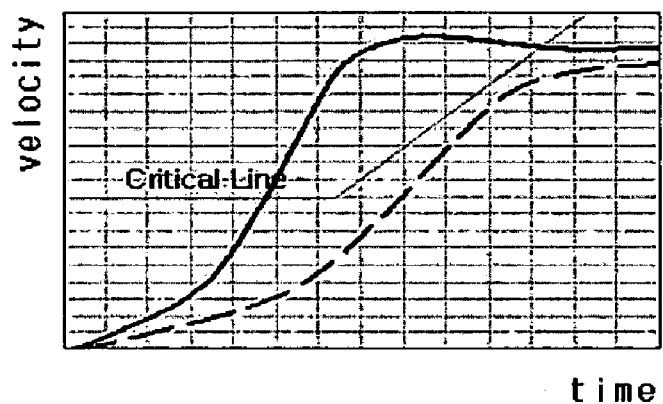
FIG. 7 is a graph illustrating velocity as a function of time, in which the velocity is calculated based on acceleration shown in FIG. 6.
Figure 8:
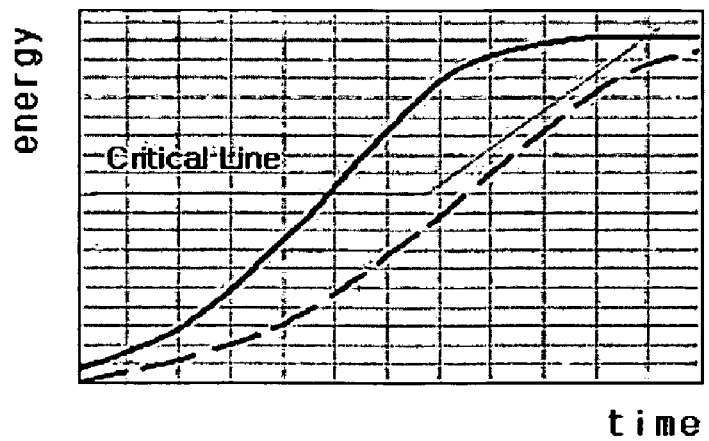
FIG. 8 is a graph illustrating energy as a function of time, in which the energy is calculated based on acceleration shown in FIG. 6.

As shown in FIGS. 4 and 5, the initial crash acceleration of the vehicle is influenced by initial crash velocity and the crash contact area of the vehicle. According to the present invention, if the initial crash velocity and the crash contact area of the vehicle increase, the initial crash acceleration of the vehicle is also increased, so that the ACU an accurately determine the deployment time of the airbag.

The present invention provides the auxiliary mounting unit installed at the front portion of the vehicle according to the engine specification and vehicle weight, so that it is possible to design the vehicle by taking the initial crash acceleration of the vehicle upon the frontal crash or offset crash of the vehicle into consideration. As a result, the airbag sensor can be stably operated to deploy the airbag according to the initial crash acceleration of the vehicle.

As described above, the crash acceleration pulse control block of the vehicle according to the present invention has advantages as follows:

First, higher initial crash acceleration is obtained when the vehicle accident occurs so that the ACU can easily determine the deployment time of the airbag based on the higher initial crash acceleration.

Second, crash energy is absorbed by means of the airbag at the initial stage of crash so that an acceleration value potentially contributing to injury of the occupants can be reduced.

Third, vehicles having different vehicle specifications and using the same chassis may generate similar initial crash acceleration, so that the ACU can reliably determine the level of crash.

Fourth, impact applied to the vehicle is distributed over a relatively large area of the vehicle, thereby potentially reducing injury to pedestrians subject to the vehicle accident.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A crash acceleration pulse control block of a vehicle comprising an auxiliary mounting unit installed at a front portion of the vehicle to absorb impact energy applied to the vehicle when a vehicle accident occurs, wherein the auxiliary mounting unit adjusts a crash contact area of the vehicle, whereby an airbag may be accurately deployed based on reliable initial crash acceleration of the vehicle regardless of changes in engine specification and a vehicle weight.

2. The crash acceleration pulse control block as claimed in claim 1, wherein the auxiliary mounting unit includes a combination type block structure having a honeycomb shaped section.

3. The crash acceleration pulse control block as claimed in claim 2, in which plural blocks are provided in the combination type block structure in a number adjustable according to a vehicle specification so as to adjust a level of initial crash acceleration of the vehicle when the vehicle accident occurs.

4. The crash acceleration pulse control block as claimed in claim 1, wherein the auxiliary mounting unit includes an auxiliary bumper back beam in a form of a bar in which at least one of a sectional area of the bar is adjustable or a material for the bar is changeable according to a vehicle specification so as to adjust a level of initial crash acceleration of the vehicle when the vehicle accident occurs.

* * * * *